Feb. 7, 1967  W. L. HIERSTEINER  3,302,861
COMBINATION PROCESSING AND MAILING ENVELOPE
Filed June 8, 1965  4 Sheets-Sheet 4
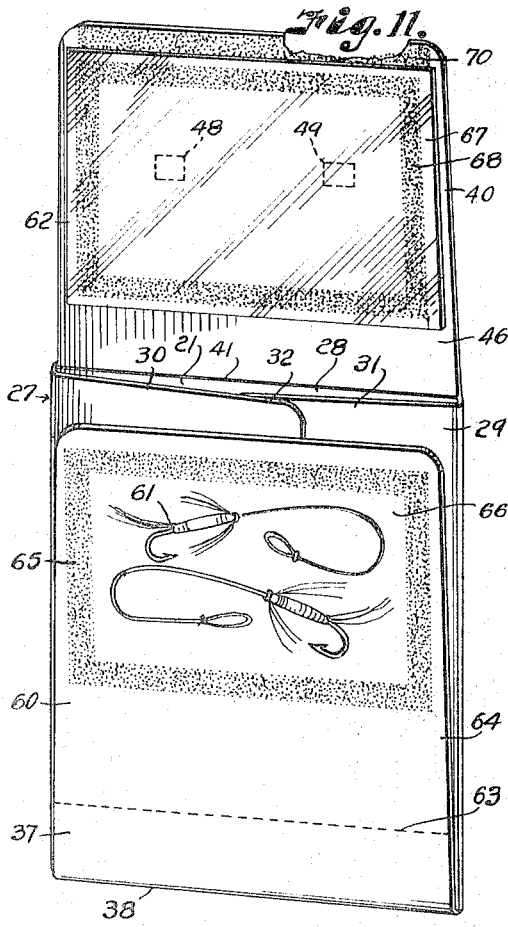
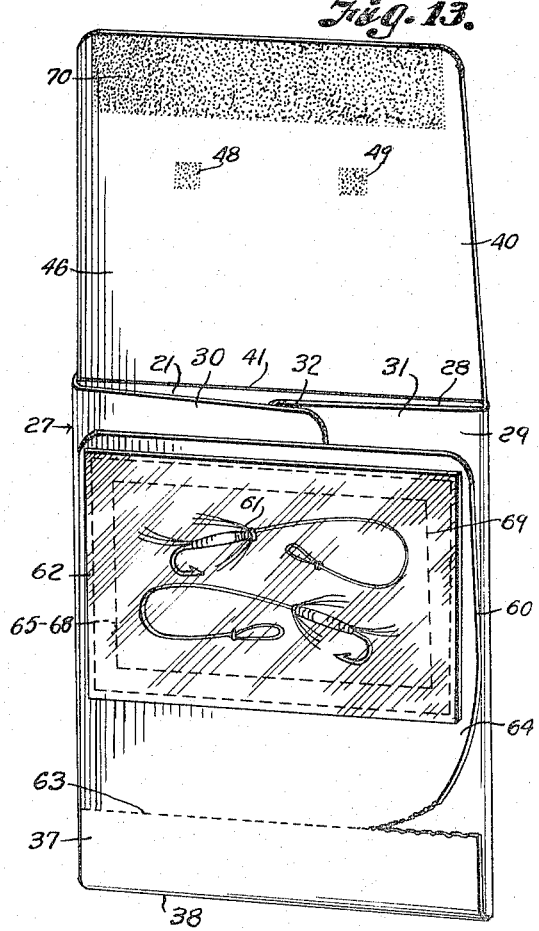
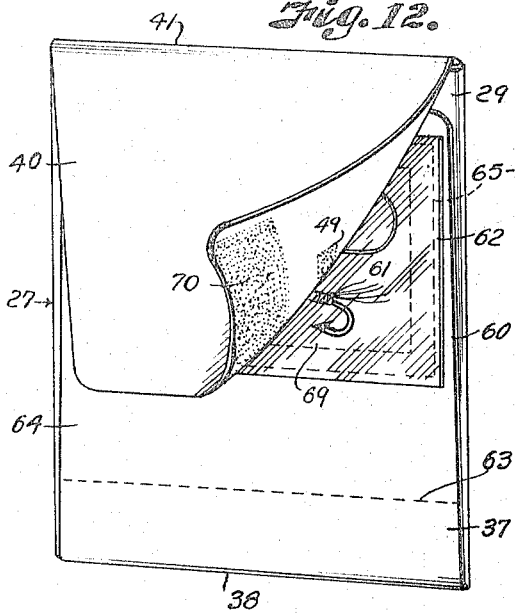
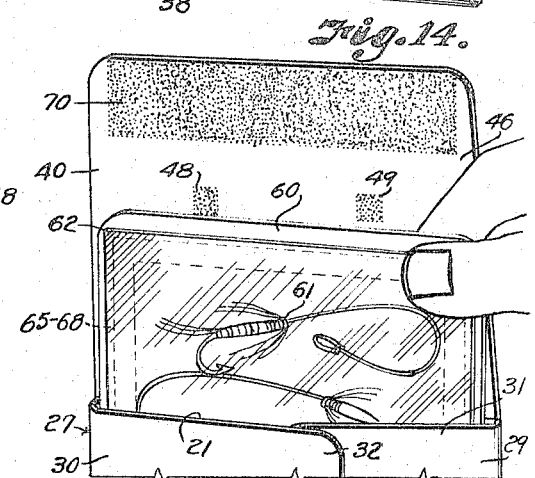
INVENTOR.
Walter L. Hiersteiner.
BY
Paul E. Mullendore
ATTORNEY.

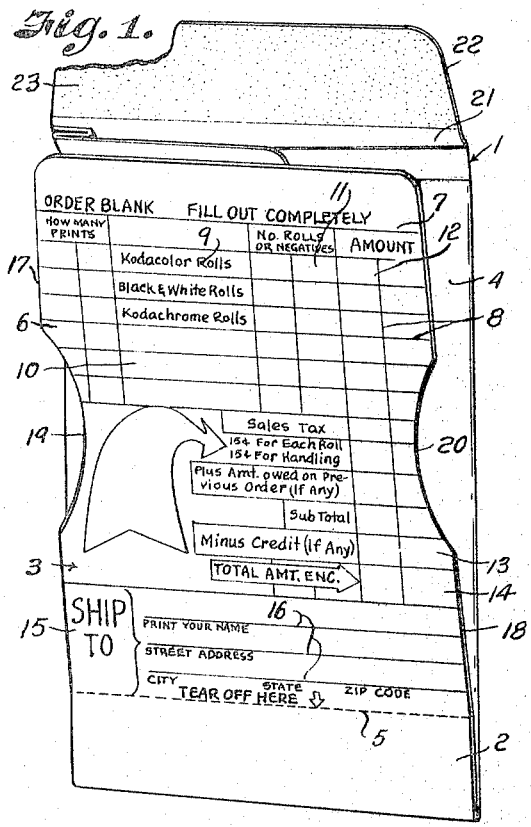
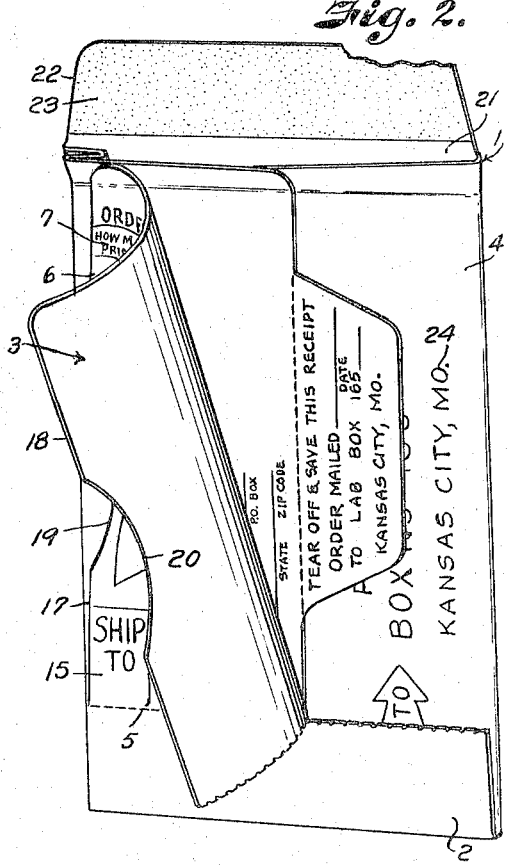
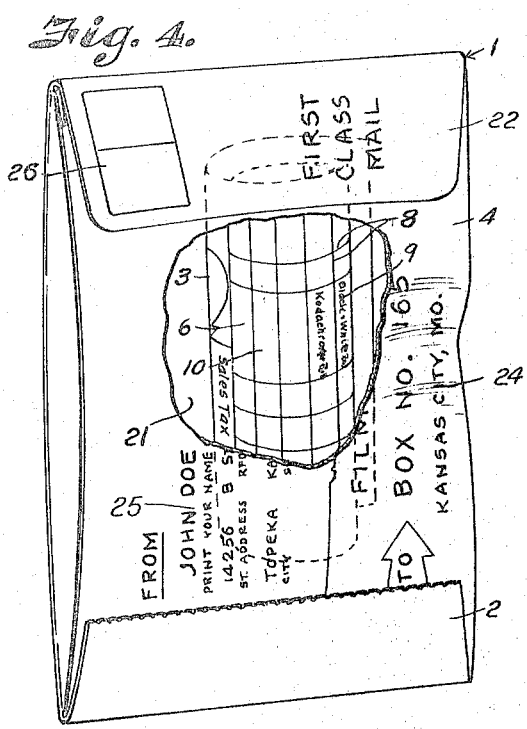
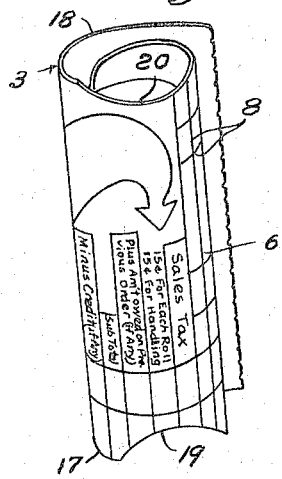

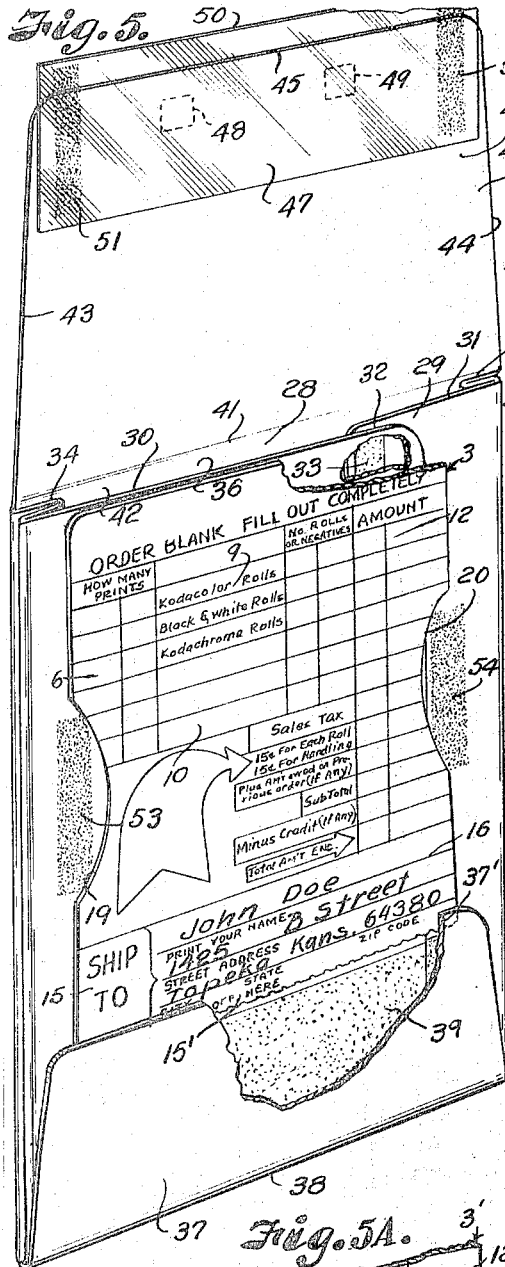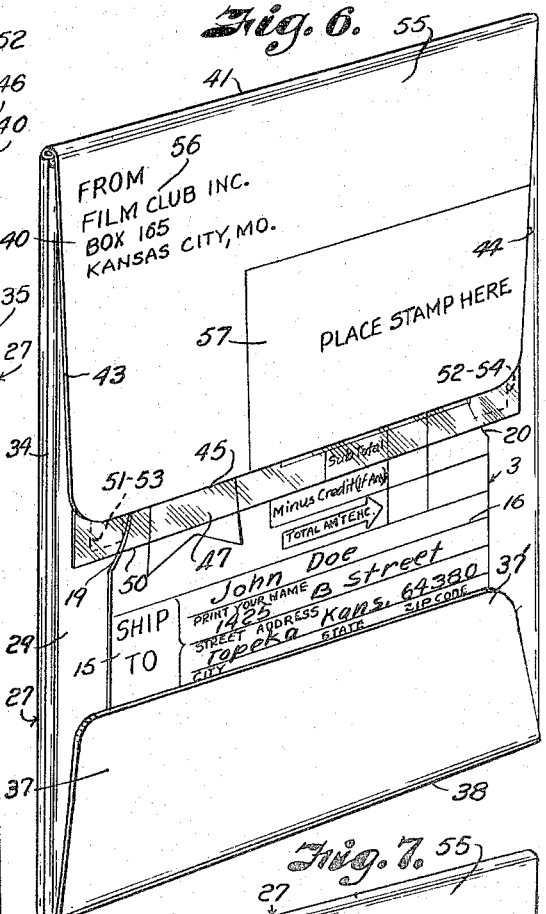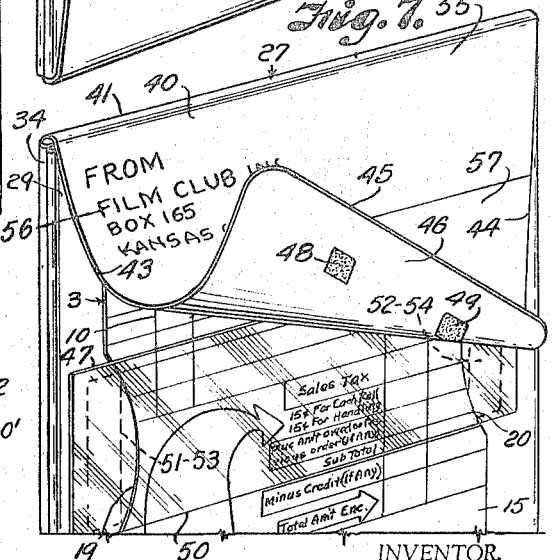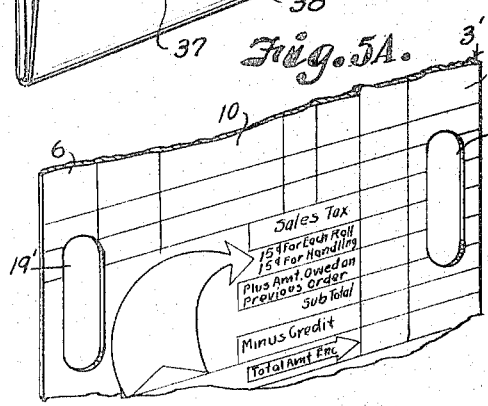

United States Patent Office 3,302,861
Patented Feb. 7, 1967

3,302,861
COMBINATION PROCESSING AND MAILING ENVELOPE
Walter L. Hiersteiner, Mission, Kans., assignor to Tension Envelope Corporation, Kansas City, Mo., a corporation of Delaware
Filed June 8, 1965, Ser. No. 462,187
14 Claims. (Cl. 229—70)

This invention relates to a combination order processing and mailing envelope for transmission of articles to a customer.

Order processing and mailing envelopes are adapted for many uses, but they are especially useful to photographic film processing companies that furnish their customers with an order envelope which includes as a part thereof an order form or sheet. The customer fills out the order form and applies his name and address thereon. The order form is detached by the customer from the envelope and is enclosed in the order envelope, together with the film and money in payment of the order. Such order envelopes are usually printed with the address of the processor, so that it is only necessary for the customer to seal and mail the envelope.

When the order is received by the processing company, an employee opens the order envelope and places the film in a processing envelope having a face portion on which he copies the order, together with the name and address of the customer. The processing envelope with the film therein is delivered to the various departments for developing the film, printing the pictures, and making enlargements, as copied on the processing envelope. As each item in the order is completed, it is placed in the processing envelope. After completion of the order, the envelope is closed and sealed, to be forwarded to the customer, using the mailing address that has been copied or otherwise applied thereon.

Such processing envelopes are most useful in keeping an order intact through the processing plant and preventing mixup of the parts of one customer's order with those of another customer. However, time is required to copy an order on such processing envelopes and in applying the customer's name and address. Also, errors are apt to occur in copying an order and applying the customer's mailing address.

It is, therefore, an object of the present invention to provide an improved processing and mailing envelope equipped with convenient means for applying or attaching the customer's original order directly thereto, and for safely retaining it during progress through the various departments of the processing plant, and thereby eliminate the necessity of any copying and prevent mistakes that may result thereby.

It is a further object of the invention to retain the original order on a receiving portion or member of the processing and mailing envelope in a manner so that the customer's address thereon is used for the mailing address when the processing envelope with the filled order therein is sealed and mailed to the customer.

Other objects of the invention are to attach the order-securing and retaining means to the envelope at the time of manufacturing the processing envelope, and to provide the receiving portion or member of the processing envelope with self-sealing adhesive to secure the order-retaining means securely over the original order form or sheet, with the mailing address in exposed position and with the order portion covered by the closure flap of the envelope.

Order processing and mailing envelopes are also of benefit to a manufacturer or seller of small items, in that they provide the material for packaging or carding such items in an attractive and orderly manner, as well as an envelope in which the package or card is placed for transmission to a customer.

In accomplishing these and other objects of the invention as hereinafter described, I have provided improved structure, the preferred form of which is illustrated in the accompanying drawings, wherein:

FIG. 1 is a perspective view of one type or order envelope to be supplied to a customer and showing an order form or sheet attached to a flap thereof that is used with the combination processing and mailing envelope of the present invention.

FIG. 2 is a similar perspective view showing the order form being detached from the envelope.

FIG. 3 is a perspective view showing the order form wrapped about a roll of film to be placed in the order envelope.

FIG. 4 is a perspective view of the order envelope showing a portion thereof broken away to illustrate the enclosure of FIG. 3 therein, and illustrating the closure flap sealed to retain the enclosure for mailing to the processor.

FIG. 5 is a perspective view of the combination processing and mailing envelope of the present invention, and showing the order form of the customer in position on the receiving face of the envelope, with the closure flap open and carrying the order form retaining means thereon.

FIG. 5A illustrates a modified form of order form in which the order form has holes or openings instead of the notches of that shown in FIGS. 1, 2 and 5.

FIG. 6 is a similar perspective view, but showing the closure flap folded to transfer the retaining means over the order form, and with the ends thereof sealed to the receiving face of the envelope at the respective sides of the order form.

FIG. 7 is a perspective partial view of the envelope, showing the closure flap being pulled loose from the order-retaining means.

FIG. 8 is a perspective view showing the closure flap opened and the envelope expanded to contain the film and other items that are to be inserted therein in the various departments of a photographic processing plant.

FIG. 9 is an enlarged sectional view through the envelope on the line 9—9 of FIG. 8, to better illustrate the manner of retaining the order form.

FIG. 10 is a perspective view of the processing and mailing envelope with the filled order contained therein and with the closure flap closed over the order portion and sealed closed by an adhesive strip, leaving the customer's address exposed to serve as the mailing address.

FIG. 11 is a perspective view of a modified form of the invention, especially adapted for processing the packaging or carding of articles, the articles to be packaged being shown in a pressure sealing adhesive area on the receiving member or card, such as an extension on a body flap of the envelope, and in position to be covered by a retaining patch carried by the closure flap.

FIG. 12 is a similar view showing the closure flap after it has been folded to transfer the retaining patch and showing the flap partly lifted to peel the closure flap loose from the retaining patch.

FIG. 13 is a view with the closure flap opened and the retaining patch sealed over the articles on the receiving member or card to provide a package.

FIG. 14 shows the receiving member or card removed and being inserted into the pocket of the envelope.

Referring more in detail to the drawings, and first to the customer's order envelope illustrated in FIGS. 1 to 4, inclusive:

The envelope 1 may be of any construction that has a sealed flap 2, for example, at the bottom of the envelope, so that it may have an extension 3 projecting therefrom to overlie the rear panel 4 of the envelope. The extension 3 is detachably secured to the flap 2 on an easy line of tear 5, that may be a line of perforations as shown. One face of the extension 3 has an order form 6 an upper portion 7 (FIG. 1) provided with transverse and longitudinal lines 8, the transverse lines providing spaces for indicating the kinds of rolls of film used by the customer, as indicated at 9, blank spaces 10 to be filled in with the number of prints of enlargements which the customer may desire, the number of rolls of film to be enclosed, as indicated at 11, and spaces for the amount of each item, as indicated at 12. Other spaces 13 may be provided concerning the order and to apply the total of the amount for the order enclosed, as indicated at 14. A part of the order form, such as the lower portion 15, is provided with lines 16 on which the customer applies his name and address. The side edge portions 17 and 18 of the order are preferably provided with cutouts 19 and 20, for example, with arcuate notches as shown in FIGS. 1, 2, 5 and 8, or holes 19'-20' as shown in FIG. 5A, for use of the order form with the combined processing and mailing envelope of the present invention, as later to be described.

After completely filling out the order, the extension or order form 3 is detached along the line of perforations 5, as shown in FIG. 2, and wrapped about the film, together with the money, as shown in FIG. 3, to form an assembly that is inserted into the pocket 21 of the order envelope, as shown in FIG. 4. The closure flap 22 of the order envelope is folded over the insert opening of the pocket and sealed by an adhesive 23.

Removal of the order form from the flap 2 exposes the address 24 of the processing company, so that all that is required of the customer is to fill in his return address, as indicated at 25, and apply the necessary postage 26.

The order envelope 1 is generally old, with the exception of the cutouts in the order form thereof, and the envelope 1 is illustrated and described to better disclose the preferred origin of the order form 3 to be attached to the combined processing and mailing envelope 27 of the present invention, illustrated in FIGS. 5 to 10, inclusive. It is, of course, understood that the blank forms may be otherwise distributed to the customer.

The envelope 27 of the present invention includes substantially rectangular panels 28 and 29. The panel 28 is solid, but the panel 29 may be formed by side flaps 30 and 31 of the panel 28 to provide overlapping portions 32 connected together by an adhesive 33 to provide the receiving portion of the envelope for the order form 3, as later to be described. The flaps 30 and 31 are integral with the sides of the panel 28 and may have expansion folds 34 and 35 to provide an expandable pocket 36 between the panels 28 and 29. The bottom of the pocket is closed by a flap 37 integral with the panel 28 by a fold 38, to overlie the bottom portion of the panel 29 for connection therewith by an adhesive 39.

The panel 28 has a closure flap 40 connected therewith by a fold 41 which extends across the width of an insert opening 42 at the upper end of the envelope. The side edges 43 and 44 of the closure flap preferably converge to the transverse edge 45 thereof, for a purpose later described. The closure flap 40 may be of any suitable depth, but is illustrated as being of a depth corresponding to about half the height of the envelope when the closure flap is in folded position, as shown in FIGS. 6 and 10.

In using the order form 3 with the envelope 27, the invention contemplates means to prevent movement of the order form transversely as well as longitudinally of the panel to which it is attached.

One aspect of the invention is to utilize an order form 3 having a height so that it fits between the fold 41 of the closure flap 40 and a part of the bottom flap 37 to prevent longitudinal movement. A strip of transparent material is extended across the outer face of the order form 3 and has its ends fixed to the panel 29 at the respective side edges of the order form. This arrangement prevents transverse movement and holds the order form against the outer face of the panel 29.

It is a further concept of the invention to provide sides of the order form 3 with cutouts through which the ends of the transparent strip are fixed to the panel of the processing envelope, which prevents longitudinal movement of the order form prior to folding the closure flap 40 and while the order is being processed.

In carrying out the invention, the inner face 46 of the closure flap carries means to retain the order form, such as a strip 47 of preferably transparent material, and which is temporarily connected therewith by a small amount of adhesive, which may be in the form of spots 48 and 49. In the form of the invention illustrated in FIGS. 5 to 10, the strip 47 conforms substantially to the width of the portion of the flap to which it is attached, and may have the transverse edge 50 thereof projecting from the edge 45 of the closure flap, as shown in FIG. 5. Applied to the ends of the strip 47 on the face opposite to the face secured by the adhesive spots 48 and 49 are strips of preferably pressure sealing adhesive 51 and 52 that are spaced apart in accordance with the spacing of the notches 19 and 20 of the order form 3 previously described. Located near the sides of the panel 29 in alignment with the adhesive stripes 51 and 52 are complementary stripes of pressure sealing adhesive 53 and 54, which, when the closure flap is folded on the fold 41, are sealingly engaged with the pressure sealing adhesive stripes 51 and 52 to cooperate with the strip 47 in holding the order form 3 and retaining it from longitudinal movement on the panel 29.

The panels 28 and 29 of the envelope may be suitably printed with information and/or advertising concerning the processing company, and the outer face 55 of the closure flap 40 may be printed with the return address 56 of the processing company and with a space 57 for applying postage stamps or postal marks, as the case may be.

The spots of adhesive 48 and 49 and transparent strip 47, as well as the pressure sealing stripes 51–53 and 52–54 are easily applied during manufacture of the envelope, so that the envelopes may be supplied by the envelope manufacturer to the processing company in the condition shown in FIG. 5.

If the order form is of a size to fit between the fold line and a part of the bottom flap, the adhesive 39 is applied to leave a loose lip 37' on the closure flap 37, under which the lower edge 15' of the order form 3 is tucked, as shown in FIGS. 5, 6, 8 and 10, to hold down that end of the order form. With this conception of the invention, the cutouts 19 and 20 could be eliminated if desired. In this case the stripes of adhesive 51–53 and 52–54 would be located in offset alignment with the side edges of the order form 3.

The combination processing and mailing envelope and the order form of the order envelope are used as follows:

An employee of the processing company will open the order envelope 1, remove the contents, and flatten the order form 3, to be applied to one of the combination processing and mailing envelopes 27. The envelopes 27 are delivered to the processing company in flat condition with the closure flap extended and the strip 47 attached thereto by the adhesive spots 48 and 49. After checking the order with the payment received, the order form 3 will be placed in flat condition on the receiving portion which constitutes the panel 29 of one of the envelopes 27 and centered between the stripes 53 and 54 of pressure sealing adhesive, so that adjacent side portions of the adhesive stripes are exposed. In this position of the order form 3, the lower address portion 15 of the order form will lie below the lower ends of the adhesive stripes 53 and 54, as shown in FIG. 5. If the order form is of sufficient size, the lower edge 15' will be tucked under the lip 37' of the bottom flap 37. In this instance, the upper edge of the order form will fall near the fold line 41.

The closure flap 40 will be folded on the fold line 41 to bring the transparent strip 47 into flat contact with the face of the order form 3, as shown in FIG. 6. This brings the stripes of pressure sealing adhesive 51 and 52 on the transparent strip into superimposed registry with the stripes of pressure sealing adhesive 53 and 54. By applying slight pressure on the side margins of the closure flap 40, the adhesive stripes 51 and 52 will stick to the adhesive stripes 53 and 54, respectively. When the portions of the pressure sealing adhesive are within the notches or recesses of the order form 3 (FIG. 5) or in the holes 19' and 20' of FIG. 5A, these portions of the order form will be gripped between the sealed-together adhesives, to anchor the order form from movement in any direction on the panel 29, although the pressure sealing adhesive does not stick to the order form.

The closure flap 40 will now be peeled loose from the transparent strip 47 by breaking loose the adhesive spots 48 and 49, as shown in FIG. 7. This is easily accomplished without pulling loose the transparent strip from the panel 29, because the pressure sealing adhesive holds much tighter than the small adhesive spots 48 and 49. Also, the adhesive spots peel loose from the surface of the transparent strip 47 without tearing either the strip 47 or the closure flap 40. With the strip 47 now securely holding the order form (see FIG. 8), the film roll or rolls are inserted into the pocket of the envelope.

The envelope is now passed to the film developing department for development of the films. The employees can readily read the portions of the order covered by the strip 47 because of its transparency (FIG. 8).

After development of the film, the negatives are placed in the pocket of the envelope and the envelope will be delivered to the printing department, where the prints are ordered on the order form 3 will be made. The prints, together with the negatives, are placed in the pocket of the envelope.

The order having been completed, the envelope will be delivered, with all of the items therein, to the mailing department for sealing and mailing. The closure flap 40 will be folded on the fold line 41 to cover the upper portion of the order form. Since the edge 45 of the closure flap terminates above the address portion 15 of the order form, the customer's address is exposed to serve as the mailing address of the envelope.

The closure flap is now sealed closed, for example, by applying a strip 58 with moistened adhesive 59 on the back thereof, to seal with the lower marginal portion of the closure flap and exposed portions of the strip 47 (see FIG. 10). The converging side edges 43 and 44 of the closure flap allow ample room for the ends of the strip 58 to make a seal with the sides of the panel 29.

It is obvious that the order form 3 is firmly retained during handling of the envelope in the mails, and that the address portion which has been addressed by the customer is the shipping address of the envelope. Consequently, there can be no mistake in delivery of the envelope.

In the concept of the invention where the lower edge 15' of the order form is tucked under the lip of the bottom flap and the upper edge is near the fold 41, the order form will be restrained from movement under the strip 47, even without the cutouts.

While the closure strip 58 may be applied to seal with a narrow portion of the order form 3 below the transparent strip 47, this is not necessary, because the strip 47, by itself, provides ample security for the address portion of the order form 3.

The envelope is easily opened by the customer without destroying the order form 3, so that he can compare the items received with his order.

It is also obvious that the customer's order 3 is kept intact, together with the items in the pocket of the envelope, through the processing plant, so that there can be no confusion between orders.

While the invention is particularly described for use by photographic processors, it is obvious that the invention is also adaptable for use by manufacturers, novelty houses, and the like, for processing and packaging or carding small items that may be contained together in a transparent type of package which is subsequently inserted into the pocket of the envelope, as incorporated in the form of the invention illustrated in FIGS. 11 to 14, inclusive.

The envelope part 27 of this form of the invention is generally the same as that previously described, and like reference numerals are used on corresponding portions of the envelope, however, a receiving member or part 60, like the order form 3, may be separate from the envelope or it may be provided as an integral part of the envelope, as shown in FIGS. 11, 12 and 13. The part 60 may be an order form or simply a card on which articles of merchandise 61 are retained by a transparent strip or patch 62, temporarily affixed to the inner face 46 of the closure flap 40 of the envelope.

In the illustrated instance, the part 60 is shown as an extension of the bottom flap 37 and the width and length thereof are of a size to fit within the pocket 21. The card 60 is provided with an easy line of tear, such as a line of perforations 63, extending transversely thereof. The face 64 of the card has a pressure sealing adhesive 65 located thereon in a manner to accommodate the item or articles of merchandise 61 to be retained by the patch 62. In the illustrated instance, the adhesive 65 is applied in the form of a box enclosing an area 66 on which the articles of merchandise 61 are placed when the envelope is to be used. The transparent patch 62 is of a size and shape to be provided on the surface 67 with pressure sealing adhesive 68, substantially conforming in shape to the shape of the adhesive 65 on the card 60. The opposite face 69 of the patch 62 is initially secured to the inner face 46 of the closure flap 40 by the spots of adhesive 48 and 49 and in position so that the adhesive 68 thereon registers with the adhesive 65 on the card 60 when the closure flap 40 is folded on the fold line 41. The closure flap may also be provided with adhesive 70 extending thereacross by which the closure flap 40 is subsequently sealed in closed position to the body of the envelope.

The envelope just described is furnished by the envelope manufacturer with the card 60 and patch 62 attached as described. The user, in using the envelope, places the articles of merchandise 61 on the area 66 of the card 60, as shown in FIG. 11. The closure flap 40 is then folded on the line of fold 41 to bring the transparent patch 62 with the adhesive 68 thereon into covering relation with the articles of merchandise and to effect a pressure seal of the adhesives 65 and 68. The closure flap 40 is then lifted from the card 60 to break loose the adhesive spots 48 and 49, as shown in FIG. 12, and leave the transparent patch 62 sealed over the articles of merchandise 61 on the card 60, as shown in FIG. 13. The card 60 bearing the packaged merchandise is removed from the envelope by tearing along the line of perforations 63, shown in FIG. 13. The card 60, with the merchandise thereon, is then inserted into the pocket 21 of the envelope, as shown in FIG. 14. With the package in the pocket, the adhesive 70 on the closure flap 40 is moistened and the closure flap is again folded along the fold line 41 to cover the insert opening and make sealing contact with the panel 29 of the envelope. The envelope may be addressed on one of the panels and provided with the required postage.

What I claim and desire to secure by Letters Patent is:
1. A processing and mailing envelope in combination with an order form having an order on the upper portion and an address on the lower portion thereof, said envelope including substantially rectangular panels connected together along three edges thereof to provide a pocket and open at the remaining edges to provide an insert opening to said pocket, a closure flap extending from one of the panels at the insert opening, a strip extending transversely of the closure flap, adhesive temporarily fixing the strip to the inner face of the closure flap, said closure flap having a transverse fold at the insert opening on which the closure flap folds to close the insert opening and to effect transfer of said strip to a position across the order form after the order form is superimposed on the other of said panels, adhesive having a greater hold than the first named adhesive for securing ends of the strip in sealing contact with the said other panel at opposite sides of the order form for retaining the order form with the address thereon exposed to serve as a mailing address for the envelope and to hold the strip when the closure flap is lifted for exposure of the insert opening, and means for securing the closure flap in said closed position.

2. A processing and mailing envelope in combination with an order form having an order on the upper portion and an address on the lower portion of one face thereof, said envelope including substantially rectangular panels connected together along three edges thereof to provide a pocket and open at the remaining edges to provide an insert opening to said pocket, a closure flap extending from one of the panels at the insert opening, spaced pressure sealing adhesive on the other of said panels to center the order form therebetween, a transparent strip to extend across the order form, spots of adhesive temporarily fixing the strip transversely of the inner face of the closure flap, pressure sealing adhesive on ends of said strip complementary to the pressure sealing adhesive on the said other panel, said pressure sealing adhesive having greater hold than the spot adhesive, said closure flap having a transverse fold at the insert opening to effect transfer of said strip across the order form with the complementary pressure sealing adhesive on said strip into sealing contact with the pressure sealing adhesive on the said other panel to leave the strip sealed to said other panel for retaining the order form when the closure flap is lifted to pull loose from said adhesive spots to uncover the insert opening for inserting items into the pocket as specified on the order form and which are retained in said pocket upon refolding of the closure flap on its line of fold to cover the order form except for the address portion, and means for securing the closure flap in said covering position.

3. The combination as described in claim 2, wherein said means for securing the closure flap comprises a strip of tape extending across the closure flap and having adhesive thereon to stick to the closure flap and portions of the envelope.

4. A processing and mailing envelope in combination with an order form having an order on the upper portion and an address on the lower portion thereof, said envelope including substantially rectangular panels connected together along three edges thereof to provide a pocket and open at the remaining edges to provide an insert opening to said pocket, a closure flap extending from one of the panels at the insert opening, spaced apart stripes of pressure sealing adhesive on the other of said panels to center the order form therebetween, a transparent strip to extend across the order form, spots of adhesive temporarily fixing the strip transversely of the inner face of the closure flap, stripes of pressure sealing adhesive on ends of said strip complementary to the stripes of pressure sealing adhesive on the said other panel, said closure flap having a transverse fold at the insert opening to bring said strip across the order form and the complementary stripes of pressure sealing adhesive on said strip into sealing contact with the stripes of pressure sealing adhesive on the said other panel to leave the strip sealed to said other panel for retaining the order form when the closure flap is pulled loose from said adhesive spots to uncover the insert opening for inserting items into the pocket as specified on the order form and which are retained upon refolding of the closure flap on its line of fold to close the insert opening for retaining said items and to cover the order form except for the address, and means for sealing the closure flap in said covering position.

5. A processing and mailing envelope in combination with an order form having an order on the upper portion and an address on the lower portion of one face thereof and provided with cutouts at opposite side edges thereof, said envelope including substantially rectangular panels connected together along three edges thereof to provide a pocket and open at the remaining edges to provide an insert opening to said pocket, a closure flap extending from one of the panels at the insert opening, spaced apart pressure sealing adhesive on the other of said panels and located at said cutouts to center the order for therebetween, a transparent strip to extend across the order form, pressure sealing adhesive on ends of said transparent strip complementary to the pressure sealing adhesive on the said other panel to fix the order form to the said other panel, said closure flap having a transverse fold at the insert opening on which the closure flap folds over the upper portion of the order form for retaining items listed on the order form and which have been placed in said pocket, and means for securing the closure flap in said closed position.

6. A processing and mailing envelope in combination with an order form as described in claim 5, wherein said cutouts are holes in said order form.

7. A processing and mailing envelope in combination with an order form having an order on the upper portion and an address on the lower portion of one face thereof and provided with cutouts in opposite side edges intermediate said upper and lower portions, said envelope including substantially rectangular panels connected together along three edges thereof to provide a pocket and open at the remaining edges to provide an insert opening to said pocket, a closure flap extending from one of the panels at the insert opening, spaced apart stripes of pressure sealing adhesive on the other of said panels and located at said cutouts to center the order form therebetween, a transparent strip to extend across the order form, spots of adhesive temporarily fixing the strip transversely of the inner face of the closure flap.

stripes of pressure sealing adhesive on ends of said strip complementary to the stripes of pressure sealing adhesive on the said other panel, said closure flap having a transverse fold at the insert opening to bring said strip across the order form at said cutouts and the complementary stripes of pressure sealing adhesive on said strip into sealing contact with the stripes of pressure sealing adhesive on the said other panel to leave the strip sealed to said other panel for retaining the order form when the closure flap is pulled loose from said adhesive spots to uncover the insert opening for inserting items into the pocket as specified on the order form and which are retained in said pocket upon refolding of the closure flap on its line of fold in covering relation with the order portion of the order form, and means for sealing the closure flap in said covering relation with the lower portion of the order form exposed whereby the address thereon serves as the mailing address of the envelope.

8. A processing and mailing envelope in combination with an order form as described in claim 7, wherein said cutouts in the order form constitute slots registrable with the stripes of pressure sealing adhesive on the said other panel to expose said stripes of pressure sealing adhesive therethrough to be contacted with the stripes of pressure sealing adhesive on the ends of the transparent strip.

9. A processing and mailing envelope in combination with an order form having an order on the upper portion and an address on the lower portion of one face thereof, said envelope including substantially rectangular panels connected together along side edges and at the bottom edges by a bottom flap on one of the panels and sealed to the other panel to provide a pocket and open at the remaining edges and providing an insert opening to said pocket, a closure flap extending from one of the panels at the insert opening and having a line of fold, said bottom flap having a lip portion, spaced apart pressure sealing adhesive on the said other panel to center the order form therebetween when the lower edge of the order form is tucked under said lip portion and the upper edge of the order form is near the line of fold of the closure flap, a transparent strip to extend across the order form, pressure sealing adhesive on ends of said transparent strips complementary to the pressure sealing adhesive on the said other panel to fix the order form to the said other panel, said closure flap being foldable on said line of fold to close the insert opening and contain the upper edge of the order form within said fold and the lower edge under said lip of the bottom flap, and means for securing the closure flap in said closed position.

10. A processing and mailing envelope in combination with an order form having an order on the upper portion and an address on the lower portion of one face thereof, said envelope including substantially rectangular panels connected together along side edges thereof and along bottom edges by a bottom flap connected to one of the panels by a fold and lapping over the other panel to provide a pocket, and open at the remaining edges providing an insert opening to said pocket, adhesive connecting the bottom flap to the other panel and leaving a loose lip portion on the bottom flap, a closure flap extending from the said one panel at the insert opening, spaced apart stripes of pressure sealing adhesive on the other of said panels centering the order form therebetween with the lower edge thereof under the lip of the bottom flap and the upper edge in substantial registry with the edges of the panels at the insert opening, a transparent strip to extend across the order form, spots of adhesive temporarily fixing said strip transversely of the inner face of the closure flap, stripes of pressure sealing adhesive on ends of said strip complementary to the stripes of pressure sealing adhesive on the said other panel, said closure flap having a transverse fold at the insert opening to bring said strip across the order form and the complementary stripes of pressure sealing adhesive on said strip into sealing contact with the stripes of pressure sealing adhesive on said other panel to leave the strip sealed to said other panel for retaining the order form when the closure flap is pulled loose from said adhesive spots to uncover the insert opening for inserting items into the pocket as specified on the order form and which are retained in said pocket upon refolding of the closure flap on its line of fold in covering relation with the order portion of the order form, and means for sealing the closure flap in said covering relation with the order portion and with the lower portion of the order form exposed whereby the address thereon serves as the mailing address of the envelope.

11. An envelope of the character described, including substantially rectangular panels connected together along three edges thereof to provide a pocket between said panels and said remaining edges being unconnected to provide an insert opening to said pocket, a closure flap extending from one of the panels at said insert opening, an article disposed upon the outer face of part of the envelope and leaving exposed areas on said part of the envelope at opposite sides thereof, a sheet having a transverse length longer than the spacing of the exposed areas, adhesive temporarily securing said sheet to the inner face of the closure flap, and adhesive for securing the sheet to said exposed areas and having greater hold than the first named adhesive, said closure flap having a transverse fold at the insert opening on which the closure flap folds to bring said sheet across the disposed article and into sealing contact with the exposed areas by said last named adhesive to establish a permanent seal of said sheet across the article for securing the disposed article and to provide resistance for causing the temporary seal to break loose from the closure flap when the closure flap is lifted for insertion of an insert through the insert opening and into the pocket.

12. An envelope as described in claim 11, wherein the adhesive which secures said sheet to the exposed areas of said part of the envelope is a pressure sealing adhesive on said exposed areas and a corresponding pressure sealing adhesive on said sheet.

13. An envelope as described in claim 11, wherein said part of the envelope upon which the article is disposed is the other of said panels.

14. An envelope as described in claim 11, wherein said part of the envelope is an extension from one of the edge connections and overlying the other panel.

References Cited by the Examiner

UNITED STATES PATENTS

| 902,375 | 10/1908 | Cheape | 229—76 |
| 1,765,146 | 6/1930 | Gonzalez | 229—80 X |
| 3,026,019 | 3/1962 | Arganbight | 229—72 |
| 3,197,121 | 7/1965 | Hayes | 229—92.1 |
| 3,203,621 | 8/1965 | Wright | 229—62 |

FOREIGN PATENTS 520,174  4/1940  Great Britain.

JOSEPH R. LECLAIR, *Primary Examiner.*

DAVID M. BOCKENEK, *Examiner.*